US005476879A

United States Patent [19]

Woods et al.

[11] Patent Number: 5,476,879

[45] **Date of Patent: * Dec. 19, 1995**

[54] ACOUSTIC CEILING PATCH SPRAY

[75] Inventors: John R. Woods, Woodland Hills; Harry Wu, Los Angeles, both of Calif.

[73] Assignee: Spraytex, Inc., Woodland Hills, Calif.

[ * ] Notice: The portion of the term of this patent subsequent to Aug. 30, 2011, has been disclaimed.

[21] Appl. No.: 250,706

[22] Filed: May 27, 1994

Related U.S. Application Data

[63] Continuation-in-part of Ser. No. 19,419, Feb. 19, 1993, Pat. No. 5,341,970.

[51] Int. Cl.$^{6}$ .............................. B32B 7/00; B32B 27/00

[52] U.S. Cl. .............................. 521/78; 222/394; 427/256; 427/421

[58] Field of Search .............................. 521/78; 427/256, 427/421; 222/394

[56] References Cited

U.S. PATENT DOCUMENTS

| | | | |
|---|---|---|---|
| 3,338,848 | 8/1967 | Hamilton | 521/78 |
| 3,572,330 | 3/1971 | Gander | 521/78 |
| 3,640,916 | 12/1972 | Dill | 521/78 |
| 3,705,669 | 12/1972 | Cox | 521/78 |
| 3,912,667 | 10/1975 | Spitzer et al. | 521/78 |
| 4,584,324 | 4/1986 | Bauman et al. | 521/78 |
| 5,341,970 | 8/1994 | Woods | 521/78 |

*Primary Examiner*—Morton Foelak
*Attorney, Agent, or Firm*—Loeb and Loeb

[57] ABSTRACT

An acoustic ceiling patch or textured material in the form of a sprayable composition including a base, a filler and a binder as well as a propellant or carrier storable and dispensable from a pressurized dispenser having a delivery nozzle and a removable dispensing tube. An aerosol system with a spray nozzle is included on the container for selective discharge of the textured material onto a prepared patch area which may be on a drywall or support panel so as to match and blend with the surrounding acoustic ceiling surface area in order to provide a continuous and unbroken coextensive surface texture of mechanically and visually matched material. A distribution straw is included for selectively conducting the textured material in a desired direction while holding the dispenser upright.

6 Claims, 1 Drawing Sheet

ACOUSTIC CEILING PATCH SPRAY

RELATED APPLICATIONS

This application is a continuation-in-part of U.S. patent application No. 08/019,419, filed on Feb. 19, 1993, now U.S. Pat. No. 5,341,970, entitled Acoustic Ceiling Patch Spray.

BACKGROUND OF THE INVENTION

1. Field of the Invention

The present invention relates to surface texture materials, and more particularly to a novel pressurized substance in liquid or semi-liquid form which is storable and dispensable from an air-tight pressurized container to be sprayed onto a drywall or supporting surface so that after subsequent curing and hardening, a matching textured surface is provided with that of surrounding acoustic ceiling areas.

2. Brief Description of the Prior Art

It has been the conventional practice in the procedure of repairing drywall or patching acoustic ceiling areas to remove the damaged portion of the ceiling and subsequently fill any holes, depressions or the like with a prepared patch material. The patch or replacement material is applied by means of a trowel or other flat tool which will press the patch material into the hole or depression and which will prepare and provide a surface area to receive a finish surface coating. After the patch material has cured and adhered to the original support material, a smooth surface is provided which receives the final coating. This coating leaves a smooth surface which is not matched to the surrounding roughened or textured surface.

An acoustic ceiling surface usually presents a surface texture which is bumpy or presents an irregular look and sometimes is referred to as a "Popcorn effect". Such an appearance and surface texture cannot be attained through the use of smoothing tools or patch tools once the patch material has been applied to the damaged or repaired area. Therefore, difficulties and problems have been encountered which stem largely from the fact that the use and application of conventional patching material on acoustic ceiling repairs leaves a surface texture which does not match the surrounding area and which is noticeable after the repair has been completed.

With respect to conventional patch substances, prior means of dispensing such patch substances have included the use of air compressors or hand operated spray pumps of the type used to dispense insect repellant. These are inadequate because they are time consuming in use and require substantial cleanup. Also, two hands are normally required for directional control of the discharge or spray.

Therefore, a long-standing need has existed to provide a material that may be readily applied to a repaired patch or surface so that the repaired surface will match with the surrounding surface texture of an acoustic ceiling. Furthermore, there is a need for a surface texture material which may be applied to a repaired or patched area and which may be contained in a hand-held applicator, requiring only one hand, so that the material may be conveniently stored as well as applied to the repaired area in a simple and convenient manner.

SUMMARY OF THE INVENTION

Accordingly, the above problems and difficulties are obviated by the present invention which provides a novel material which is storable and dispensable from a convenient dispenser including a pressurized container holding a quantity of the acoustic ceiling surface texture material in a liquid or semi-liquid condition so that upon depression of a dispensing nozzle, the material will be discharged and directed to a patch area intended receive the surface texture material. The surface texture material includes a base, a filler, a binder, and at least one of an aggregate, a blowing agent and an expandable material, and an aerosol propellant serving as a carrier medium and a pressure source so that the texture material may be applied by spray and will adhere to the repaired patch and drywall surface.

In one form of the invention, the acoustic ceiling textured material may include: a base or emulsion of water and/or solvent, an adhesive binder made of a natural or synthetic polymer, a pressurized carrier for dispensing of the material such as a solvent/propellant aerosol, a filler made of limestone, mica and clay, and at least one of an aggregate and an expandable material. The expandable material, such as a polymer which is soft and expandable before curing, allows the textured material to expand after being dispensed from the container thereby providing the "popcorn effect".

Therefore, it is an object of the present invention to provide an acoustic ceiling spray patch material which is storable and dispensable from a hand-held dispensing unit for spray-on and direct application of the material in a liquid or semi-liquid form onto a repaired or patched area so that the surrounding surface texture will be visually and mechanically matched.

Another object of the present invention is to provide a material which is storable in and dispensable from an air-tight container such that the dispensing device may include as part of a nozzle a curved dispensing straw for directing the ingredient discharge in an overhead manner while the user is in a confined area with the device being held in a vertical position.

Another object of the present invention to provide an inexpensive, practical and economical means for matching the surface texture of a repaired or patched surface area on an acoustic ceiling with the surrounding acoustic surface texture.

A further object of the present invention is to improve the appearance of acoustic ceiling patched or repaired areas on a ceiling surface by employing a spray-on textured material which covers the patched or repaired areas and visually assumes the surface texture of the surrounding acoustic ceiling surface.

BRIEF DESCRIPTION OF THE DRAWINGS

The features of the present invention which are believed to be novel are set forth with particularity in the appended claims. The present invention may best be understood with reference to the following description, taken in connection with the accompanying drawings in which:

DESCRIPTION OF THE PREFERRED EMBODIMENT

Figure 2:
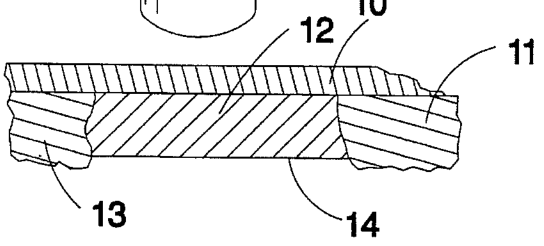
FIG. 2 is a transverse cross-sectional view of the repaired or patched area shown in FIG. 1 illustrating the dissimilarity in surface texture between the original ceiling surface and the surface of the patched areas.
Figure 3:
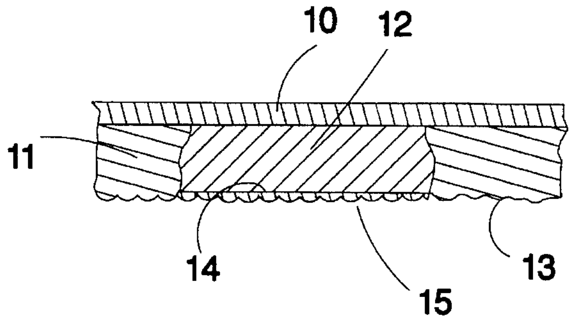
FIG. 3 is a transverse cross-sectional view of the repaired or patched area on an acoustic ceiling and illustrating matching of surface texture between the surface of the patch and the surrounding ceiling surface after use of the novel spray-on surface textured material of the present invention.

Referring in detail to FIGS. 2 and 3, a fragmentary view is shown of a typical ceiling support panel or board and is identified by numeral 10. The panel 10 supports textured acoustic material 11 which has been damaged and a repair to the damaged area which takes the form of a patch 12. After curing, the patch becomes solidified and adheres to the edge marginal region of material 11 and surface of the panel 10 defining the area covered by the patch material. The surface texture of the original material 13 can be seen to be broadly defined as being bumpy, pebbled or presenting a popcorn look.

In FIG. 2, it can be seen that the patch 12 displays a smooth surface 14 usually attained by repeatedly drawing the edge of a hand tool, such as a trowel, across the surface. After drying or curing, the material of the patch 12 becomes hard and the surface 14 remains smooth and unmatched with the surrounding irregular or raised surface 13 carried on the panel 10. Although the surface 14 will accept a variety of coatings such as paint or the like in a conventional situation, the surface texture of the coating will not simulate or blend with the surrounding irregular surface 13 of original material 11. Visually, the flat patch area 14 will always be noticeable and indicate the presence of a repair.

Figure 1:
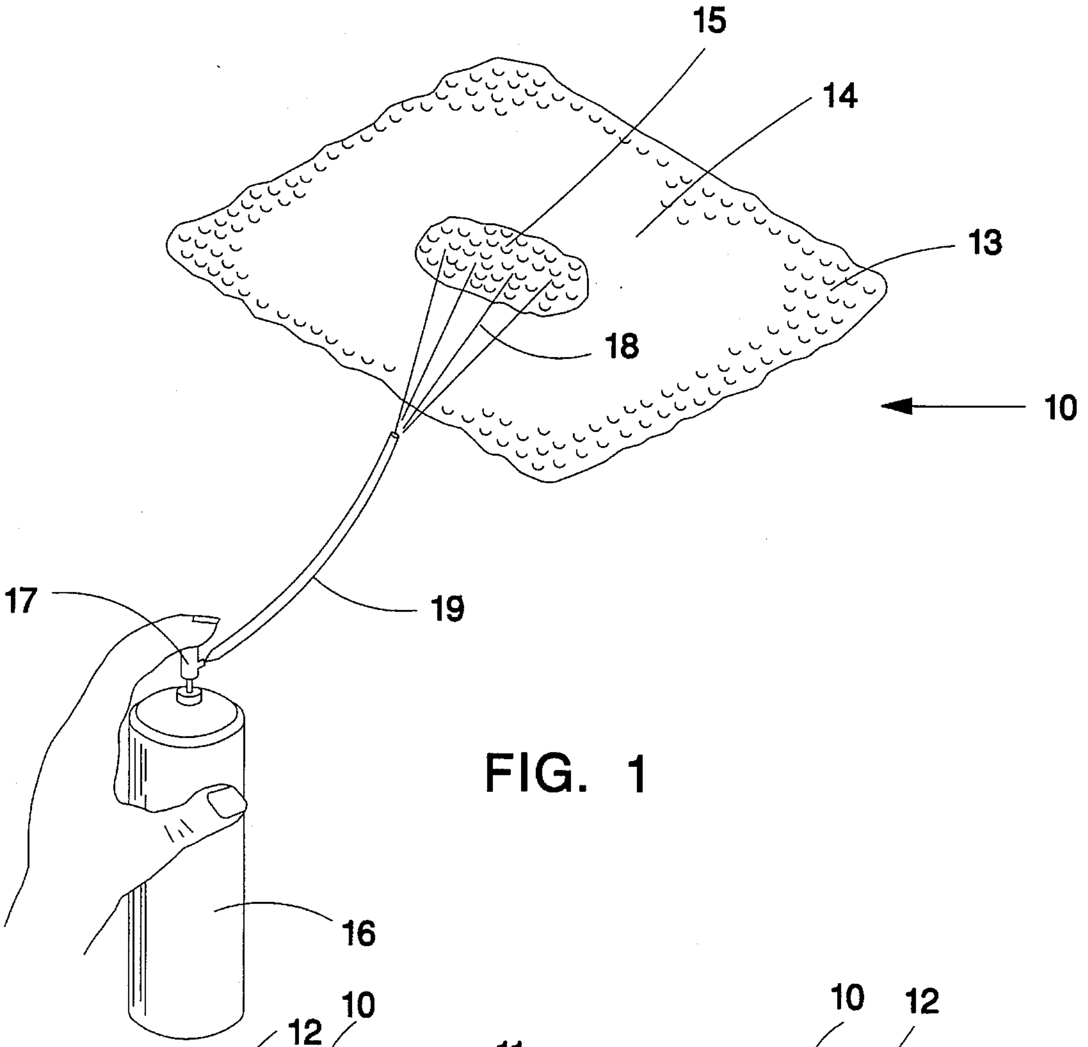
FIG. 1 is a pictorial view illustrating the direct application of the spray-on surface texture material from the dispenser of the present invention for repairing of an acoustic ceiling.

Referring now in detail to FIGS. 1 and 3, the surface textured material 15 discharged from a dispenser 16 is illustrated as being applied to the smooth surface 14 of the patch 12. In this connection, a bumpy and irregular surface is placed on the flat surface 14 so as to be compatible with, blend with and be coextensive with the surrounding ceiling surface area 13. By employment of the present invention, the surface texture of both the patch 12 and the surrounding acoustic ceiling material 13 are substantially identical and matched so that no visual indication is presented or noticeable pertaining to a repair or patch. The material being applied is broadly indicated by numeral 15 which is contained within the dispenser container 16 and applied in the form of a spray in either liquid or semi-liquid condition. Application is achieved by depression of a pump or spray nozzle 17 which permits discharge of the pressurized material carried within the container 16. Such an application of the material occurs directly on the desired area 14 by the user who hand-carries the container 16 and operates the nozzle 17 on site with one hand. Waste and loss of material is avoided since the discharge is under the control of the user through the application of the discharge nozzle 17. Therefore, there is no residue or excess material that is not used which requires disposal. Furthermore, the material 15 is lumpy and, after curing on surface 14, provides an irregular surface compatible and matching the surrounding material surface area. Furthermore, the material in the container is considered a finished product and does not require additives of any kind and the labeling on the container may provide identification numbers and laboratory information.

To control discharge of the material 15 and avoid waste, distribution may be via an elongated, curved or arcuate open-ended hollow straw or tube 19. The user may hold the dispenser container 16 in a vertical or upright orientation with the end of the straw or tube in close proximity to the repair area. The other end of the straw or tube is pressed into an mating fit with the conventional discharge opening of the nozzle 17. Without the use of a curved straw or with a straight straw, the user must hold the container at an awkward angular position since the discharge from the dispenser nozzle is always normal to the longitudinal vertical axis of the dispenser.

Preferably, an example of the material 15 comprises a base material, a filler, an adhesive binder, a propellant and at least one of a blowing agent, an aggregate and an expandable material. The base material may be any aqueous substance such as water and/or a non-aqueous substance such as alcohol, aromatic or aliphatic hydrocarbon, ketone, ester or the like. The filler may be any material that can serve as an extender or bodifier such as limestone, clay or silica, or similar materials, or a mixture thereof. Adhesive binder is an adhesive that may take the form of a natural polymer, such as gums and resins and the like, or a synthetic polymer, such as polyvinyl alcohol, alkyd resins, etc, or a combination thereof. The adhesive binder will serve to keep the material 15 in place once it has cured. The propellant will act to push or propel the material 15 from the container. The propellant may be hydrocarbon, dimethyl ether, carbon dioxide, nitrogen, compressed gas or any combination of the above said propellants or any other propellant used in the aerosol industry such as hydrofluorocarbons. Blowing agent is a material which can be in a solution or in suspension in other materials and which when exposed to atmospheric pressure or high temperatures expands and creates empty spaces within the surrounding materials. The blowing agent may be a low boiling point hydrocarbon and/or solvent. Aggregate can be any material which may be chopped or ground into small pieces and incorporated with the other materials to provide irregular texture to the material 15. The aggregate may be polystyrene foam, cork, sponge, perlite, or oatmeal.

Expandable material serves to provide tensile strength to the material 15. Any material which may add tensile strength such as a polymer, polyurethene and/or any polymeric materials which will be soft and expandable before curing, may be used. The use of the expandable material, for example a polymer, promotes expansion of the material 15 after it has been dispensed from the container 16, while allowing the material 15 to remain in an unexpanded state before dispensing. The expandable material creates the "popcorn effect" and allows the material to match the surrounding acoustic ceiling material. The components of the material which provide the material 15 with the requisite form or body, such as the filler and/or aggregate, must be put into a finer state for storage in an aerosol container and subsequent release through a conventional nozzle. The expandable material or polymer promotes expansion of the finer components to provide the "popcorn effect" as if the components had been prepared and applied in a conventional manner. Therefore, the expandable material makes storage of the material 15 in an airtight aerosol container and dispensing therefrom a desirable alternative to conventional storage and dispensing alternatives.

The material 15 may comprise any one of or any combination of a blowing agent, an aggregate or an expandable material.

By way of an example the hardenable flowable material 15 the present invention may have the following composition by percentage weight:

| | |
|---|---|
| Water/Solvent | 25–50% |
| Filler | 50–80% |
| Binder | 1–4% |
| Aggregate | 5–20% |
| Expandable Material | 2–10% |
| Blowing Agent | 1–5% |
| Liquefied Propellant | 5–25% |
| Compressed Gas | 0–1% |

Also by way of a more specific example the hardenable flowable material 15 of the present invention may have the following basic composition by percentage weight:

| | |
|---|---|
| Limestone | 48% |
| Mica | 7% |
| Clay | 1% |
| Polyvinyl Alcohol | 1% |
| Perlite | 2% |
| acrylic emulsion | 2–10% |
| Low Boiling Point Hydrocarbon | 1% |
| Dimethyl Ether | 9% |
| Water | Quantity Sufficient to achieve 100% |

wherein the limestone, mica and clay are in powder form, the low boiling point hydrocarbon may be a blend in any proportion of isobutane and propane and the acrylic emulsion which is used in the above example constitutes the expandable material and is for example that which is sold under the tradename Neocryl A-639.

Further, the composition of the material 15, as described directly above, may contain a defoaming agent such as silicone (0.10%), a preservative (0.10%), an antifreeze (0.20%), a leveling or "smoothing" agent such as amino methyl propanol (0.07%) and a thickener such as min-ugel (0.2%) and/or methocel (0.15%).

In an alternative embodiment, one component, the polyvinyl alcohol, present in 1% by weight, may serve as both the binder and the expandable material.

Further, in order to adjust the finished appearance of the material 15, acrylic polymer and/or copolymer may be added in an appropriate amount, which will increase the hardness and body. Further, alcohol and/or solvent may be added to effect faster drying times.

As illustrated in FIG. 1, the material 15 is applied directly to the smooth surface 14 and when dried or cured results in an irregular surface having a texture compatible and matched with the surrounding surface texture of the acoustic ceiling. The patch material 12 is dried and cured in preparation for receiving the material 15 and the adhesive binder included in the material 15 insures adhesion of the material to the patch area. Even if small amounts of the material would extend beyond the surface 14 onto the surrounding material, the surface would still be matched and no unsightly patch edges or dissimilar surface texture would be detectable.

The patch material may be applied via a straw 19. The hollow straw 19 may have a curved central longitudinal axis with this axis, at the input end being normal to the central longitudinal axis of the container when the input end is fitted into the mated opening in nozzle 17. If the curved central longitudinal axis associated with the discharge opening at the other end of the straw is essentially parallel to the container longitudinal axis, the user may hold the container in an upright position while distributing the hardenable substance onto an overhead patch area.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A method for forming a layer of textured patch material on a surface comprising the steps of:

storing a hardenable, flowable substance for application to a patch surface surrounded by an acoustic ceiling material having an irregular Surface texture in a fluid-tight dispensing container, said hardenable, flowable substance comprising a mixture of a liquid base substance, a filler substance of a material selected to form a binder or bodifier for the resulting patch material, an adhesive binder of a material selected to adhere the resulting patch material to the surface, a propellant and at least one of an aggregate selected to give the resulting patch material an irregular surface texture, a blowing agent and an expandable material selected to provide tensile strength for the resulting patch material wherein said fluid-tight container has means for selectively dispensing said hardenable, flowable substance in the form of an aerosol spray; and selectively dispensing the hardenable, flowable substance onto the patch surface such that the hardenable flowable substance forms a bumpy, irregular surface texture after being dispensed and curing which matches and is compatible with the acoustic ceiling material surrounding the patch.

2. A method as defined in claim 1 wherein said hardenable, flowable substance has the following composition by percentage weight:

| | |
|---|---|
| liquid base substance | 25–50% |
| filler substance | 50–80% |
| adhesive binder | 1–4% |
| propellant | 5–26% |
| aggregate | 5–20% |
| blowing agent | 1–5% |
| expandable material | 2–10%. |

3. A method as defined in claim 2 wherein:

said liquid base substance consists essentially of water;

said filler substance consists essentially of a mixture of limestone, mica and clay;

said adhesive binder consists essentially of polyvinyl alcohol;

said propellant consists essentially of dimethyl ether;

said aggregate consists essentially of perlite;

said blowing agent consists essentially of a low boiling point hydrocarbon;

said expandable material consists essentially of an acrylic emulsion; and the above-recited ingredients are present in said hardenable, flowable substance in the following percentages by weight:

| | |
|---|---|
| limestone | 48% |
| mica | 7% |

-continued

| | |
|---|---|
| clay | 1% |
| polyvinyl alcohol | 1% |
| perlite | 2% |
| acrylic emulsion | 2–10% |
| low boiling point hydrocarbon | 1% |
| dimethyl ether | 9% |
| water in a quantity sufficient to achieve | 100%. |

4. A method as defined in claim 1 wherein said hardenable, flowable substance further comprises: a defoaming agent; a preservative; an antifreeze; a leveling agent; and a thickener.

5. A method as defined in claim 4 wherein said defoaming agent consists essentially of silicone, said leveling agent consists essentially of amino methyl propanol, and said thickener consists essentially of at least one of min-ugel and methocel.

6. A method as defined in claim 1 wherein said hardenable, flowable substance further comprises at least one of an acrylic polymer and copolymer.

* * * * *